(12) United States Patent
Kobayashi et al.

(10) Patent No.: US 12,030,453 B2
(45) Date of Patent: Jul. 9, 2024

(54) SIDE AIRBAG DEVICE AND METHOD FOR MANUFACTURING AIRBAG USED IN SAME

(71) Applicant: Autoliv Development AB, Vargarda (SE)

(72) Inventors: Yuto Kobayashi, Kanagawa (JP); Hiroyuki Shima, Kanagawa (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 17/754,538

(22) PCT Filed: Sep. 2, 2020

(86) PCT No.: PCT/JP2020/033300
§ 371 (c)(1),
(2) Date: Apr. 5, 2022

(87) PCT Pub. No.: WO2021/070526
PCT Pub. Date: Apr. 15, 2021

(65) Prior Publication Data
US 2024/0059245 A1 Feb. 22, 2024

(30) Foreign Application Priority Data

Oct. 10, 2019 (JP) .................................. 2019-187144

(51) Int. Cl.
*B60R 21/231* (2011.01)
*B60R 21/217* (2011.01)
(Continued)

(52) U.S. Cl.
CPC ...... *B60R 21/23138* (2013.01); *B60R 21/217* (2013.01); *B60R 21/233* (2013.01);
(Continued)

(58) Field of Classification Search
CPC ............ B60R 2021/23146; B60R 2021/23324; B60R 2021/23576; B60R 21/233; B60R 2021/23316; B60R 2021/23308
See application file for complete search history.

(56) References Cited

U.S. PATENT DOCUMENTS

2015/0367804 A1* 12/2015 Fujiwara ............. B60R 21/2338
280/730.2
2017/0174174 A1* 6/2017 Ohno ................. B60R 21/23138
(Continued)

FOREIGN PATENT DOCUMENTS

CA 2993843 A1 * 8/2018 ............... B60N 2/42
EP 2960116 B1 * 8/2017 ........... B60R 21/207
(Continued)

OTHER PUBLICATIONS

Office Action received in corresponding Chinese Patent Application 202080065198.5, dated Mar. 31, 2023 with translation.

*Primary Examiner* — Nicole T Verley
(74) *Attorney, Agent, or Firm* — Harness, Dickey & Pierce, P.L.C.; Stephen T. Olson (57) ABSTRACT

The present invention is a side airbag device stowed in a seatback of a vehicle seat, comprising: an inflator arranged on the occupant side of a side frame which is positioned on a side part inside the seatback, that generates expansion gas, and an airbag which expands due to said expansion gas and protects the occupant seated in the vehicle seat. The airbag includes a main chamber that deploys toward the front of the seatback, and a pre-chamber that houses the inflator inside and is connected to the occupant side of the main chamber. Furthermore, an integral joint without gaps is formed by sewing between at least the front edge part of the pre-chamber and the main chamber.

14 Claims, 8 Drawing Sheets

(51) Int. Cl.
*B60R 21/233* (2006.01)
*B60R 21/235* (2006.01)
*B60R 21/239* (2006.01)
*B60R 21/264* (2006.01)

(52) U.S. Cl.
CPC .......... *B60R 21/235* (2013.01); *B60R 21/239* (2013.01); *B60R 21/264* (2013.01); *B60R 2021/23146* (2013.01); *B60R 2021/23324* (2013.01); *B60R 2021/23538* (2013.01); *B60R 2021/23576* (2013.01)

(56) References Cited

U.S. PATENT DOCUMENTS

| | | | |
|---|---|---|---|
| 2021/0129787 A1* | 5/2021 | Kobayashi | .......... B60R 21/2346 |
| 2021/0162942 A1* | 6/2021 | Kobayashi | ............ B60R 21/233 |

FOREIGN PATENT DOCUMENTS

| | | | | |
|---|---|---|---|---|
| EP | 3517371 A1 * | 7/2019 | ........... | B60R 21/207 |
| JP | 2014-162391 A | 9/2014 | | |
| JP | 2018-161999 A | 10/2018 | | |
| JP | 2019-131160 A | 8/2019 | | |
| JP | WO2020071099 A1 * | 9/2021 | | |
| WO | WO-2010076881 A1 * | 7/2010 | ....... | B60R 21/23138 |
| WO | 2014/033820 A1 | 3/2014 | | |
| WO | WO-2015020052 A1 * | 2/2015 | ........... | B60R 21/207 |
| WO | 2017/010169 A1 | 1/2017 | | |
| WO | 2017/209192 A1 | 12/2017 | | |
| WO | WO-2019026538 A1 * | 2/2019 | ........... | B60R 21/207 |
| WO | WO-2021070526 A1 * | 4/2021 | ........... | B60R 21/207 |
| WO | WO-2024024473 A1 * | 2/2024 | | |

\* cited by examiner

A1-A1 Cross section

FIG. 6A

Inner main panel 32a

FIG. 6B

Outer main panel 32b

FIG. 6C

Pre-chamber panel 34a

FIG. 6D

Baffle panel 38

FIG. 8A

Rear ← → Front

FIG. 8B

SIDE AIRBAG DEVICE AND METHOD FOR MANUFACTURING AIRBAG USED IN SAME

TECHNICAL FIELD

The present invention relates to a side airbag device installed in a vehicle seat and a manufacturing method of the airbag used therein.

BACKGROUND ART

The provision of a vehicle with one or more airbags in order to protect the occupants thereof in the event of a vehicle accident is well known. These airbags include, for example, various forms such as: a so-called driver airbag which is deployed from near the center of the steering wheel so as to protect the driver; a curtain airbag which is deployed downward on the inner side of the window of an automobile so as to protect occupants during collisions in the transverse direction of a vehicle, as well as when overturning and during rollover accidents; and a side airbag which is deployed between the occupant and the side panel so as to protect the occupant upon impact in the transverse direction of a vehicle. The present invention relates to a side airbag device provided in a vehicle seat.

For side airbag devices, there is a strong demand for a more compact device due to major installation area limitations. Moreover, there is a demand for appropriate passenger protection performance due to improved deployment speed and stabilization of the deployed shape.

In recent years, side airbag devices have been proposed that combine a plurality of chambers to form an airbag. For example, there are systems with a pre-chamber, with a relatively small capacity inside the main chamber (on the passenger side), as described in Patent Document 1. However, during airbag deployment, the front end portion of the pre-chamber could interfere with the occupant, preventing proper deployment.

RELATED ART DOCUMENTS

Patent Documents

Patent Document 1: WO 2017/209192

SUMMARY OF THE INVENTION

Problem to be Solved by the Invention

In light of the conditions described above, a purpose of the present invention is to provide a side airbag device that can optimize (stabilize) deployment behavior of the pre-chamber in side airbags having a main chamber and a pre-chamber, and a method for manufacturing airbags used therein.

Means for Solving the Problem

The following describes means for solving the problem described above and the effect thereof. In the present invention, when an occupant is seated in a seat in a normal posture, the direction the occupant faces is referred to as the "front," the opposite direction is referred to as the "rear," and the direction indicating the coordinate axis is referred to as the "front-rear direction." Moreover, when the passenger is seated in the seat in a regular posture, the right of the passenger is referred to as the "right direction," the left of the passenger is referred to as the "left direction," and the direction indicating the coordinate axis is referred to as the "left and right direction." Similarly, when the passenger is seated in the seat in a regular posture, the head direction of the passenger is referred to as "up," the waist direction of the passenger is referred to as "down," and the direction indicating the coordinate axis is referred to as the "vertical direction."

In order to achieve the purpose as described above the present invention is a side airbag device stowed in the seatback of a vehicle seat, comprising: an inflator arranged on the occupant side of the side frame which is positioned on the side part inside the seatback, that generates expansion gas, and an airbag which expands due to said expansion gas and protects the occupant seated in the vehicle seat.

The airbag includes a main chamber that deploys toward the front of the seatback, and a pre-chamber that houses the inflator inside and is connected to the occupant side of the main chamber. Furthermore, an integral joint without gaps is formed by sewing between at least the front edge part of the pre-chamber and the main chamber.

Here, the "integral joint without gaps" formed by sewing means that the pre-chamber is continuously sewn along the front edge part against the surface of the main chamber, so that no part of the pre-chamber (tip side) is separated from the main chamber and becomes unstable. Alternatively, it can be said that the expandable area of the pre-chamber does not protrude forward from the junction thereof with the main chamber.

With the present invention, an integral joint without a gap is formed between at least the front edge part of the pre-chamber and the main chamber by sewing, which prevents the edge (one part) of the pre-chamber from wobbling and catching on the occupant, stabilizing the pre-chamber's deployment behavior and contributing to improved occupant restraint performance.

The main chamber includes an inner main panel and an outer main panel, and can be formed by overlapping these two panels and sewing the outer edge parts together. The pre-chamber can be formed by sewing one pre-chamber panel to the inner main panel.

The inner main panel can be configured with a first inner vent so that expansion gas can flow from the pre-chamber to the main chamber via said first inner vent.

A baffle panel can be provided with an inner edge part connected to the inner surface of the inner main panel and an outer edge part connected to the inner surface of the outer main panel. The baffle panel can then partition said main chamber into a forward main chamber and a rear main chamber.

The baffle panel can be configured with a second inner vent to allow expansion gas to flow from the rear main chamber to the forward main chamber via said second inner vent.

The inner edge part of the baffle panel can be constructed to be arranged along the front edge part of the pre-chamber. This structure simplifies the structure itself and simplifies the manufacturing process.

The integral joint can be made of three overlapping layers: the inner main panel, the front edge part of the pre-chamber panel, and the inner edge part of the baffle panel.

A reinforcement cloth can be provided between the front edge part of the pre-chamber panel and the outer surface of the inner main panel, and the integral joint can be made of four overlapping layers that include said reinforcement cloth.

The front edge part of the pre-chamber can be provided so that the front edge part of the pre-chamber draws a curved line when viewed from the side of the vehicle seat in the width direction. When viewed from the side of the vehicle seat in the width direction, the front edge part of the pre-chamber and the inner edge part of the baffle panel can be overlapped to form a curved line.

The manufacturing method of the airbag according to the present invention includes:
- a step of preparing the inner main panel, outer main panel, and pre-chamber panel;
- a step of preparing a baffle panel arranged between the inner main panel and outer main panel that separates the main chamber into a forward main chamber and a rear main chamber;
- a first sewing step for temporarily sewing the front edge part of the pre-chamber panel to the inner main panel; and
- a second sewing step after the first sewing step for sewing the front edge part of the pre-chamber panel, the inner main panel, and the inner edge part of the baffle panel at the same time.

In the present invention, after the front edge part of the pre-chamber panel is temporarily sewn to the inner main panel, the front edge part of the pre-chamber panel, the inner main panel, and the inner edge part of the baffle panel are sewn at the same time, thereby simplifying the manufacturing process. In particular, this can easily accommodate cases where the front edge part of the pre-chamber is formed as a curved line.

The side airbags of the present invention can be applied to the type that deploys on the door side (outside) of the seat as well as the type that deploys on the center side of the vehicle of the seat. A side airbag of a type which is deployed on the vehicle center side of the seat, for example, is referred to as a far side airbag, front center airbag, rear center airbag, and the like.

DESCRIPTION OF THE PREFERRED EMBODIMENT

A vehicle seat according to an embodiment of the present invention will be described with reference to accompanying drawings. Note that "front" indicated in the drawings indicates the front side (in the traveling direction) of a vehicle, "rear" indicates the rear of the vehicle (side opposite the traveling direction), "inside" indicates the inner side in the vehicle width direction (occupant side), and "outside" indicates the outer side in the vehicle width direction (door panel side).

Figure 1:
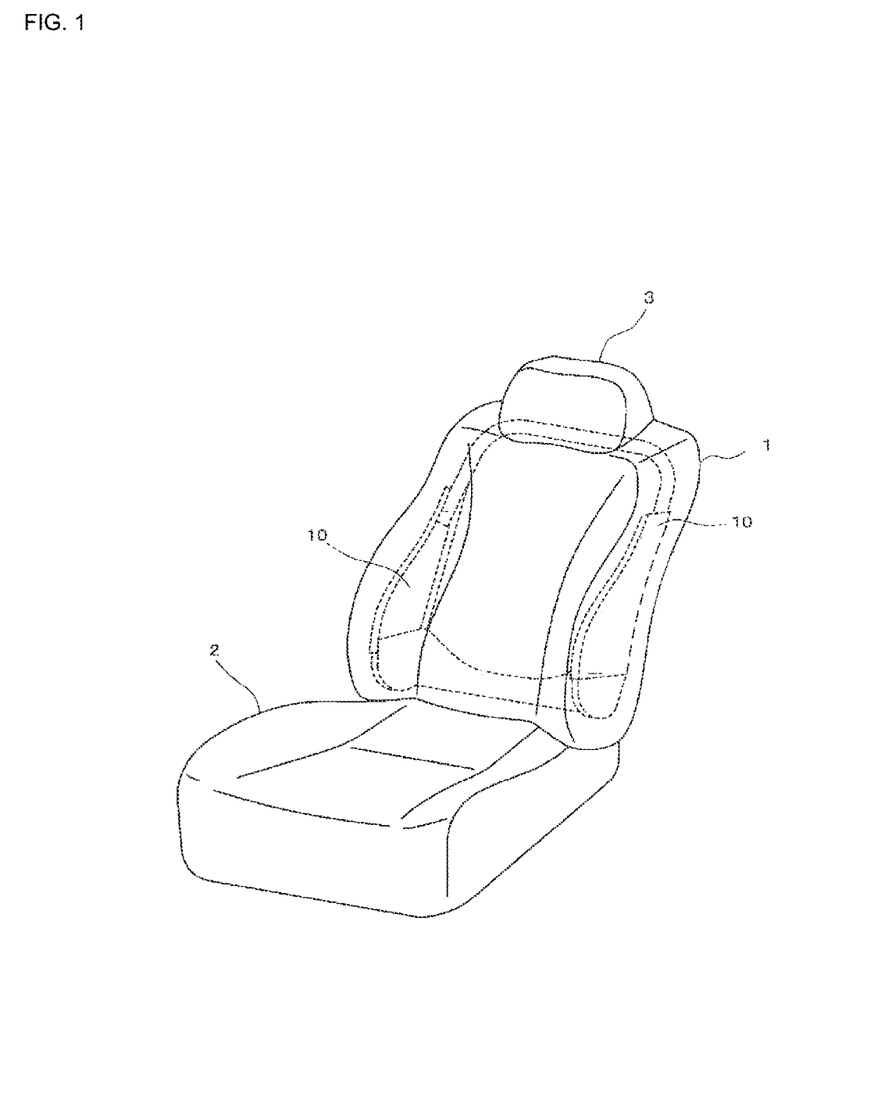
FIG. 1 is a perspective view illustrating mainly the external shape of a vehicle seat capable of having the side airbag device according to the present invention mounted therein, with illustration of the airbag unit omitted.
Figure 2:
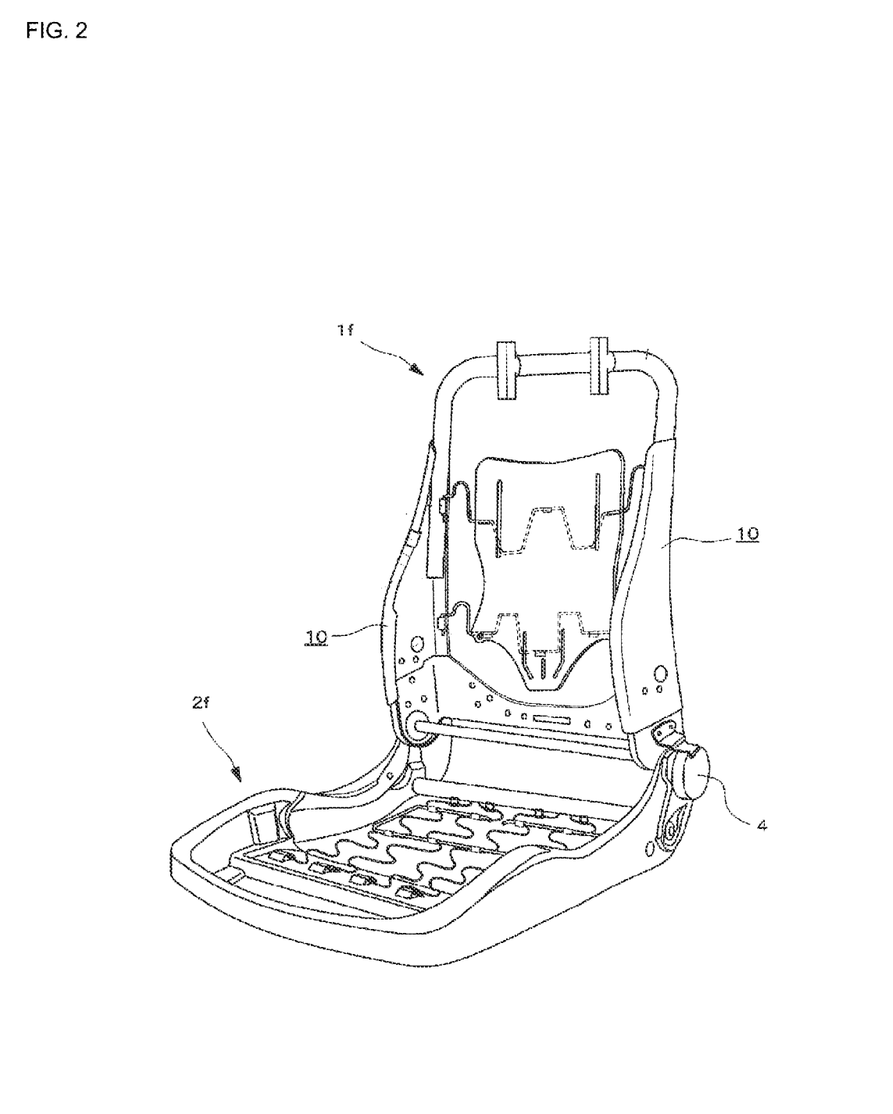
FIG. 2 is a perspective view illustrating the internal structure (seat frame) functioning as the framework of the vehicle seat illustrated in FIG. 1, with illustration of the airbag unit omitted.
Figure 3:
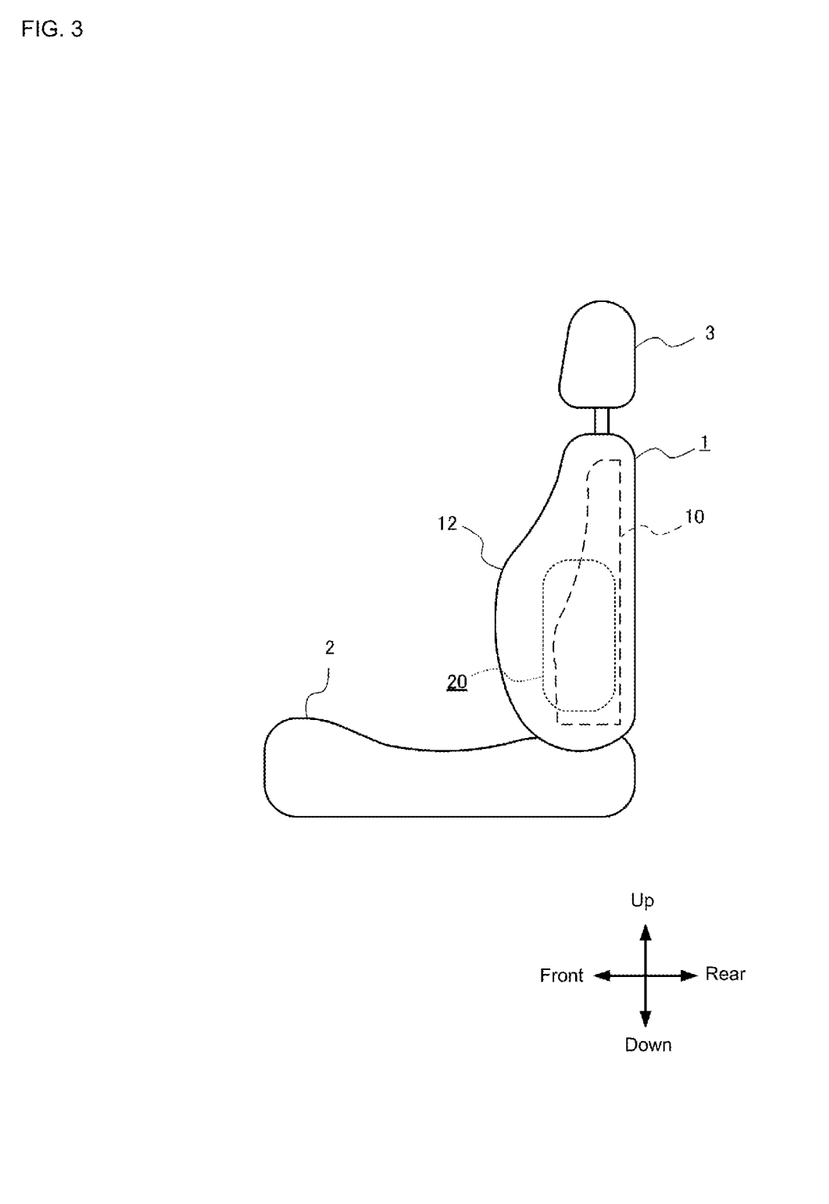
FIG. 3 is a schematic side view of the vehicle seat according to the embodiment of the present invention, illustrating the state in which the airbag unit is stowed when observed from the outside (see-through) in the vehicle width direction.

FIG. 1 is a perspective view illustrating mainly the external shape of a vehicle seat to which the side airbag device 20 according to the present invention can be applied, with illustration of the side airbag device (20) omitted. FIG. 2 is a perspective view illustrating an internal structure (seat frame) functioning as a framework of the vehicle seat illustrated in FIG. 1, with illustration of the side airbag device (20) omitted here as well. FIG. 3 is a schematic side surface view of the vehicle seat mounted with the side airbag device 20 according to the present invention, for example, illustrating a condition where the airbag device 20 is stowed on a side surface (near side) near a door as observed from the outside in the vehicle width direction.

As illustrated in FIG. 1 and FIG. 2, from the viewpoint of components, a vehicle seat to which a side airbag device 20 according to this embodiment can be applied is composed of a seat cushion 2, or a portion for an occupant to sit on, a seatback 1 forming a backrest, and a headrest 3 connected to the upper end of the seatback 1.

A seatback frame 1f that forms that framework of the seat is provided in the inner portion of the seatback 1, a pad made of urethane foam or the like is provided on the surface and periphery thereof, and a surface skin (not illustrated) is provided. As for the seat cushion 2, similar to the seatback 1, a pad made of urethane foam or the like is provided on the upper surface and periphery of the seating frame 2f, and a surface skin (not illustrated) is provided. The seating frame 2f and the seatback frame 1f are connected via a reclining mechanism 4.

As illustrated in FIG. 2, the seat back frame 1f is configured into a frame shape by side frames 10 disposed laterally spaced apart and extending in the vertical direction, an upper frame connecting the upper ends of the side frames 10, and a lower frame connecting the lower ends thereof. The headrest 3 is configured by providing a cushioned component outside a headrest frame.

Figure 4:
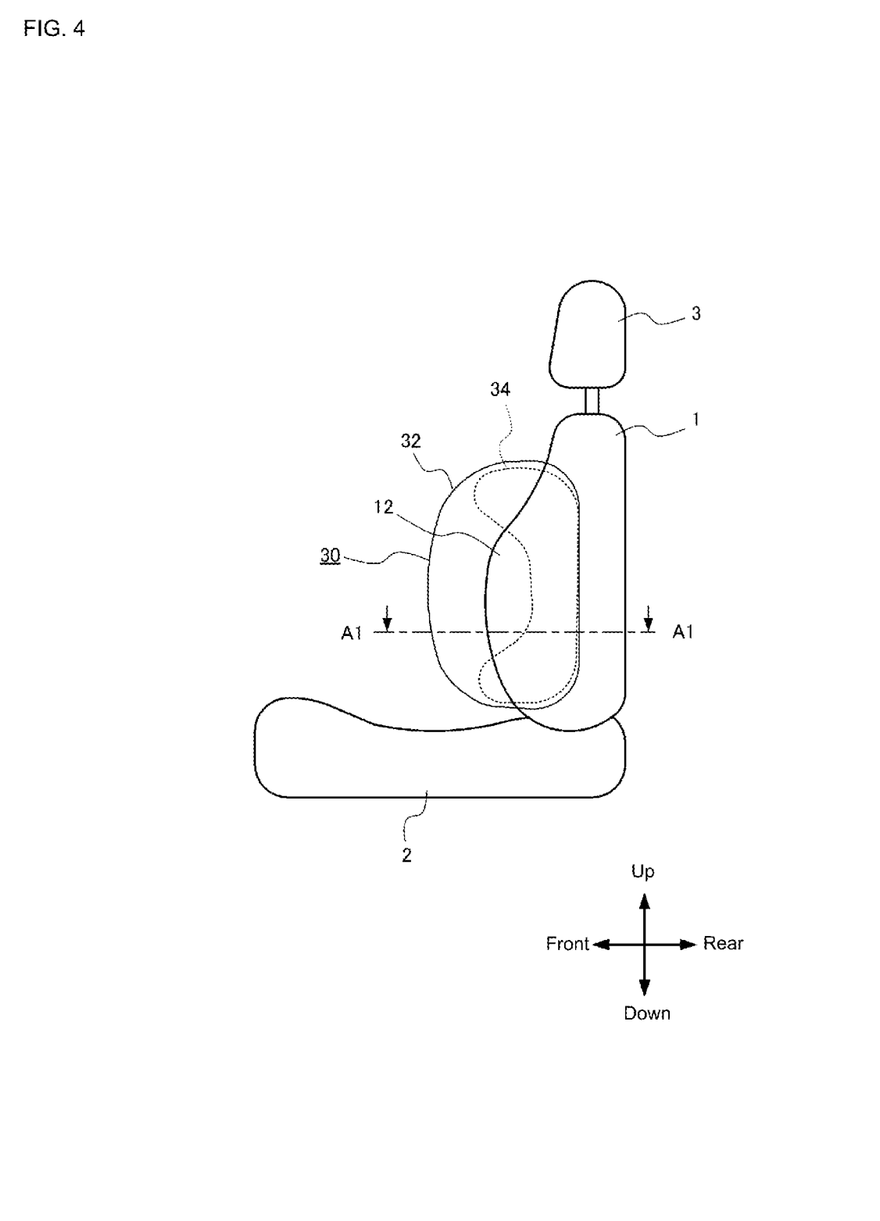
FIG. 4 is a schematic diagram (side view) illustrating the deployed state of the side airbag according to the embodiment of the present invention.

FIG. 4 is a schematic diagram (side view) that illustrates the airbag 30 (32, 34) in a deployed state. As illustrated in FIG. 4, the airbag 30 (32, 34) is provided with a main chamber 32 that deploys toward the front of the side support part 12, and a pre-chamber 34 that deploys to the inside of the main chamber 32 in the width direction (occupant side) of the vehicle.

Figure 5:
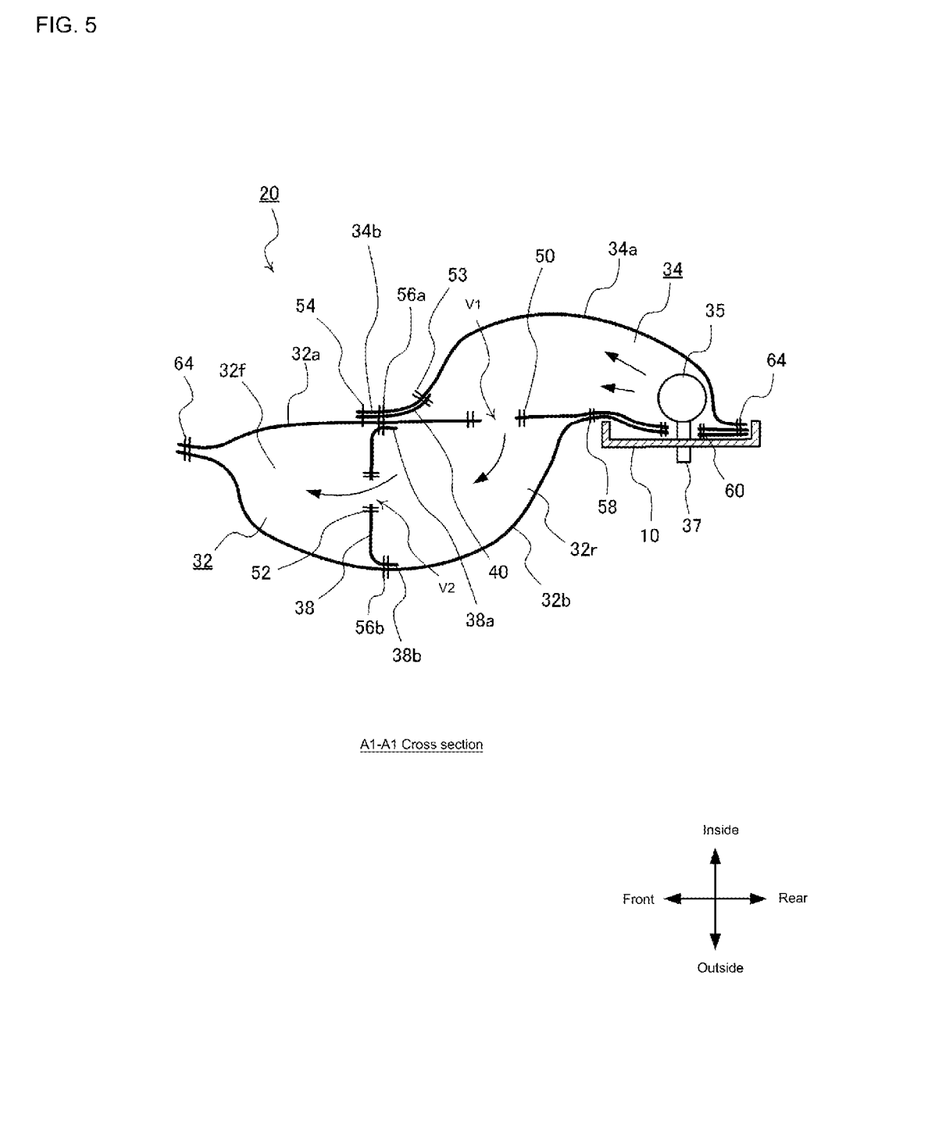
FIG. 5 is a schematic view illustrating the deployed state of the airbag according to the present invention, corresponding to the cross section along line A1-A1 in FIG. 4.

FIG. 5 is a schematic view illustrating the deployed state of the airbag 30, corresponding to the cross section along line A1-A1 in FIG. 4. FIG. 6(A) to FIG. 6(D) are plan views illustrating the main panels configuring the airbag 30 (32, 34).

The side airbag device 20 according to the present invention is arranged on the occupant side of the side frame 10, and is provided with an inflator 35 that generates expansion gas, and the airbag 30 (32, 34) that expands based on expansion gas to protect an occupant seated in the vehicle seat. The airbag 30 includes a main chamber 32 that deploys toward the front of the seatback 1, and a pre-chamber 34 that houses the inflator 35 inside and is connected to the occupant side of the main chamber 32. As will be described in more detail below, between the front edge part 34b of pre-chamber 34 and the main chamber 32 (32a), an integral joint with no gaps is formed by sewing 56a.

For example, a cylinder-type inflator having a cylindrical shape may be used as the inflator 35. Stud bolts 37 protrude from the outer circumference of the inflator 35 toward the inside in the vehicle width direction. These stud bolts 37 are attached (fastened and secured) to the side frame 10 using nuts. The inflator 35 has a plurality of circumferentially aligned gas jets (not shown), and gas is radially emitted from these gas jets. If necessary, a diffuser or other device to control gas flow can be provided around the inflator 35.

An airbag control ECU (not shown) mounted on the vehicle is electrically connected to this inflator 35. A satellite sensor (not shown) for detecting side collisions is electrically connected to this airbag control ECU. The inflator 35 can be configured to operate when the airbag control ECU detects a side collision based on a signal from this satellite sensor.

Figure 6A:
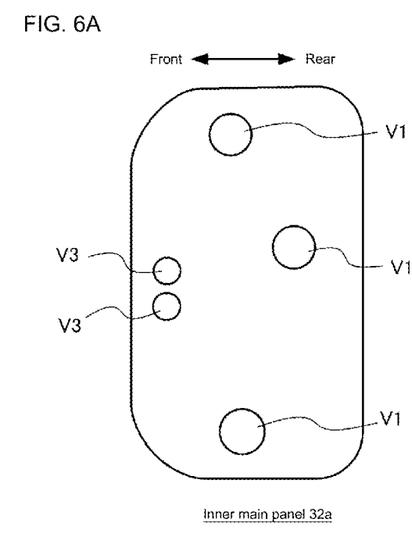
FIG. 6(A) to FIG. 6(D) are plan views illustrating the main panels configuring the airbag according to the present invention.
Figure 6B:
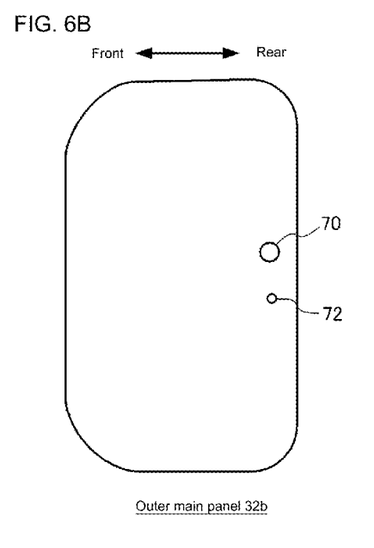

As illustrated in FIG. 5 and FIGS. 6(A) and (B), the main chamber 32 includes the inner main panel 32a located on the passenger side and an outer main panel 32b located on the opposite side from the occupant. Furthermore, these two panels 32a and 32b are stacked and the outer edge parts are sewn together to form the main chamber 32.

Figure 6C:
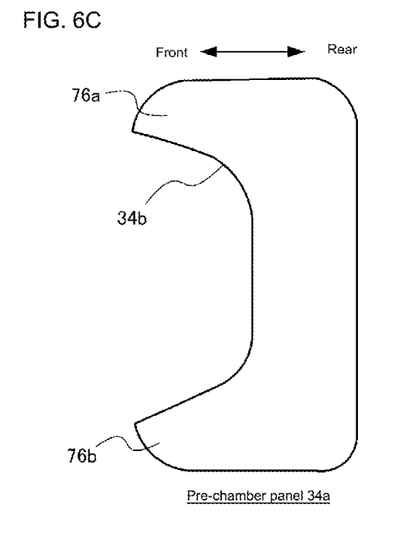

As illustrated in FIG. 5 and FIG. 6(C), the pre-chamber 34 is formed by sewing a single pre-chamber panel 34a to the inner main panel 32a. The pre-chamber panel 34a is formed with a curvature with protruding parts 76a and 76b that are the upper and lower portions of the front edge part 34b protruding forward.

As illustrated in FIG. 5 and FIG. 6(A), the inner main panel 32a has a first inner vent V1 that is formed in three places, and the expansion gas inside the pre-chamber 34 is supplied via the first inner vent V1 into the main chamber 32. Reinforcement sewing 50 is formed around the inner vents V1.

Two external vents V3 are formed near the front edge part of the inner main panel 32a to release gas to the outside. Also, an opening 70 for inserting the inflator 35 and an opening 72 to allow the stud bolts 37 of the inflator 35 to pass through are formed near the rear edge part of the outer main panel 32b.

Figure 6D:
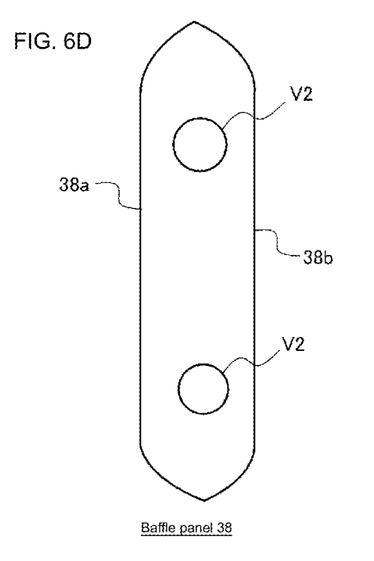

As illustrated in FIG. 5 and FIG. 6(D), the inner portion of the main chamber 32 has an inner edge part 38a connected to the inner surface of the inner main panel 32a, and a baffle panel 38 with an outer edge part 38b connected to the inner surface of the outer main panel 32b. The baffle panel 38 allows the main chamber 32 to be divided into a forward main chamber 32f and a rear main chamber 32r.

The baffle panel 38 is formed with two second inner vents V2, where expansion gas flows from the rear main chamber 32r via the second inner vents V2 into the forward main chamber 32f. Reinforcement sewing 52 is formed around the inner vents V2.

Note that the inner edge part 38a of the baffle panel 38 is connected along the front edge part 34b of the pre-chamber 34. This structure simplifies the structure itself and simplifies the manufacturing process.

As illustrated in FIG. 5, the integral joint 56a is a structure consisting of three overlapping layers, being the outer surface (external surface) of the inner main panel 32a, the front edge part 34b of the pre-chamber panel 34a, and the inner edge part 38a of the baffle panel 38. More accurately, a reinforcement cloth 40 is provided sandwiched between the front edge part 34b of the pre-chamber panel 34a and the outer surface of the inner main panel 32a, making the integral joint 56a a structure consisting of four layers, including the reinforcement cloth 40. The reinforcement cloth 40 is arranged along the front edge part 34b of the pre-chamber panel 34a, and then sewed.

Figure 8A:
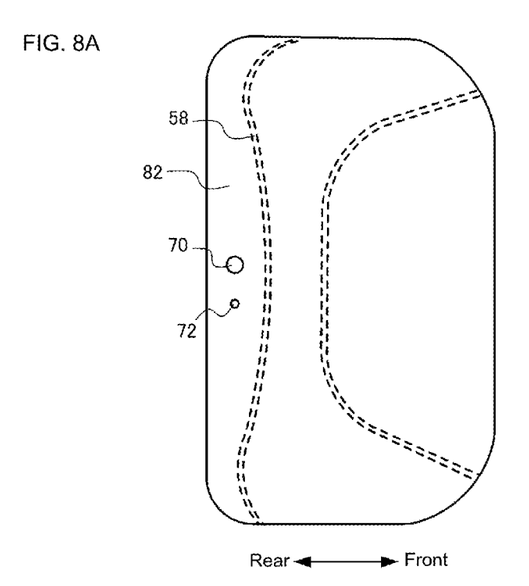
FIG. 8(A) to FIG. 8(B) are plan views illustrating the manufacturing (sewing) steps of the airbag according to the present invention, as seen from the passenger side, continuing from FIG. 7.
Figure 8B:
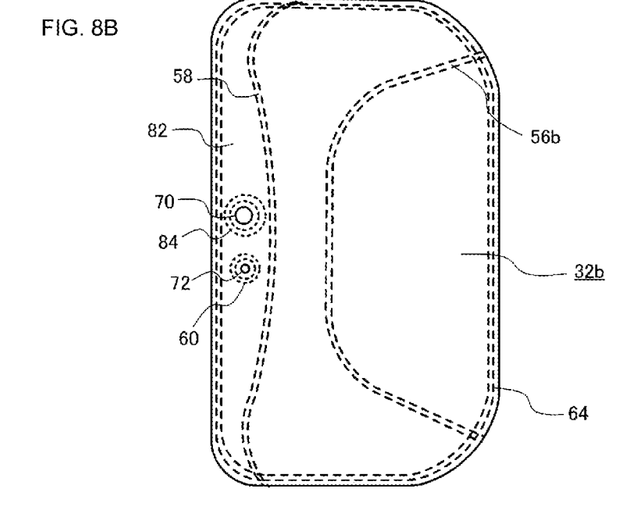

Next, a brief description of the sewn areas of each panel is given with reference to FIG. 5. Code 53 is the sewing that connects the pre-chamber panel 34a to the reinforcement cloth 40. Code 54 is the temporarily sewing together of the front edge part 34b of the pre-chamber panel 34a, the reinforcement cloth 40, and the inner main panel 32a. Code 58 is sewing connecting the inner main panel 32a and the outer main panel 32b, forming a non-expanding region 82 (see FIG. 8) for inserting the inflator 35 into the pre-chamber 34. Code 64 is sewing that connects the outer circumference of the airbag 30.

(Manufacturing Method)

Figure 7A:
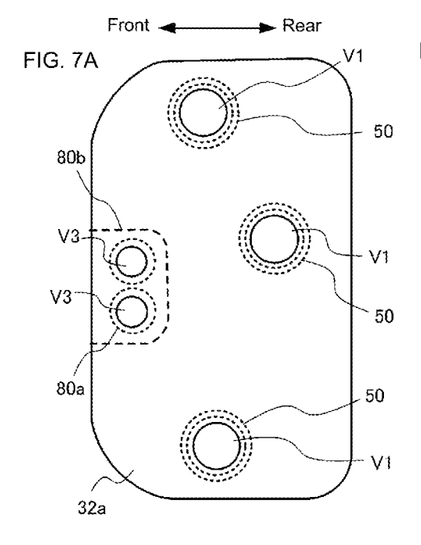
FIG. 7(A) to FIG. 7(C) are plan views illustrating the manufacturing (sewing) steps of the airbag according to the present invention, as seen from the passenger side.

FIG. 7(A) to FIG. 7(C), FIGS. 8(A) and (B) are plan views of the manufacturing (sewing) steps of the airbag 30 according to the present invention. First, as illustrated in FIG. 7(A), in the inner main panel 32a, sewing (50) is performed around the three inner vents V1, then sewing 80a and 80b is performed around the two external vents V3.

To begin with, it is extremely difficult to sew the curved edge part of the pre-chamber panel 34a and the curved edge part of the baffle panel 38 at the same time while sandwiching the flat-shaped inner main panel 32a. Therefore, in the past, the pre-chamber and main chamber were each sewn separately back-to-back, and then the pre-chamber and main chamber were joined so that the edge parts of the pre-chamber and the baffle panel do not overlap.

Figure 7B:
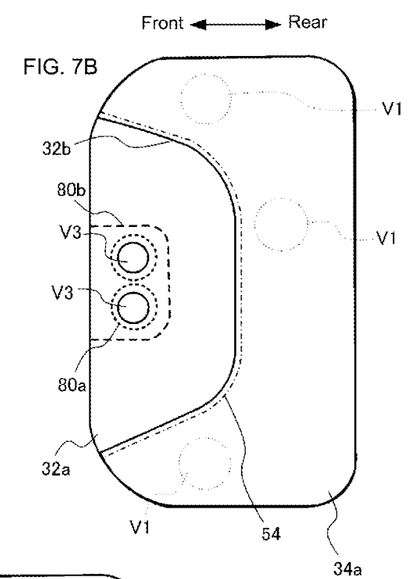

Therefore, in the present invention, following the steps in FIG. 7(A), as illustrated in FIG. 5 and FIG. 7(B), the pre-chamber panel 34a is overlaid on the surface of the inner main panel 32a and temporary sewing 54 is performed along the front edge part 34b of the pre-chamber panel 34a. Herein, the reinforcement cloth 40 is sewn at the same time.

Figure 7C:
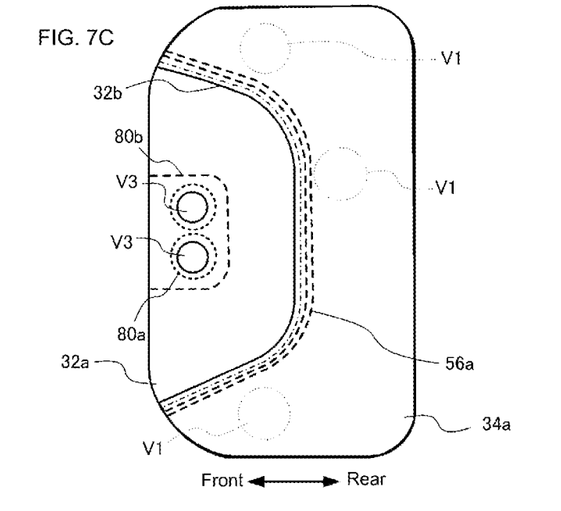

Next, as illustrated in FIG. 5 and FIG. 7(C), the front edge part 34b of the pre-chamber panel 34a, reinforcement cloth 40, inner main panel 32a, and the inner edge part 38a of the baffle panel 38 are sewn at the same time, forming an integral connecting part 56a. At the same time, the outer edge part 38b of the baffle panel 38 and the outer main panel 32b are sewn (56b) together.

Next, as illustrated in FIG. 5 and FIG. 8(A), sewing 58 is performed in the vertical direction on the inner main panel 32a and outer main panel 32b in front of the openings 70 and 72 of the inflator 35, forming the non-expanding region 82. In order to clearly illustrate the sewing locations, FIG. 8 illustrates the state illustrated in FIG. 7 inverted front to back.

Next, as illustrated in FIG. 5 and FIG. 8(B), reinforcement sewing 60 and 84 is performed around the openings 70 and 72 of the inflator 35. Thereafter, sewing 64 is performed around the entire perimeter of the inner main panel 32a and the outer main panel 32b.

In the present invention, an integral joint without a gap is formed between the front edge part 34b of the pre-chamber 34 and the main chamber 32 (32a) by sewing 56a, which prevents the edge part (one part) of the pre-chamber 34 from wobbling and catching the occupant when the airbag 30 is deployed, stabilizing deployment behavior of the pre-chamber 34, and contributing to improved occupant restraining performance.

In addition, after the front edge part 34*b* of the pre-chamber panel 34*a* is temporarily sewn (54) to the inner main panel 32*a*, the front edge part 34*b* of the pre-chamber panel 34*a*, the inner main panel 32*a*, and the inner edge part 38*a* of the baffle panel 38 are sewn at the same time, thereby simplifying the manufacturing process. In particular, this can easily accommodate cases where the front edge part 34*b* of the pre-chamber 34 is formed as a curved line.

While the present invention has been described with reference to the abovementioned illustrative embodiments, many equivalent changes and variations will be obvious to those skilled in the art from the present disclosure. Therefore, the abovementioned illustrative embodiments of the present invention are presumably illustrative and not limiting. Without departing from the spirit and scope of the present invention, the described embodiments may take on various modifications. For example, while a side airbag on the near side has been predominantly mentioned in the Description of the Preferred Embodiment, use is also possible with a far side airbag (surface on the far side from a vehicle door of a vehicle seat), in very small vehicles such as a single seat vehicle (irrespective of the presence of a door, a vehicle including parts with only one seat in a single row), and the like.

The invention claimed is:

1. A side airbag device stowed in a seatback of a vehicle seat, the side airbag device comprising:
   an inflator arranged on an occupant side of a side frame positioned on a side part of the seatback, the inflator operative to generate expansion gas; and
   an airbag for expanding due to the expansion gas and protecting an occupant seated in the vehicle seat,
   the airbag including a main chamber for deployment forward of the seatback, and a pre-chamber stowing the inflator in an inner portion thereof and connected to the occupant side of the main chamber, and
   an integral joint with no gaps present formed between at least a front edge part of the pre-chamber and the main chamber,
   wherein the main chamber includes an inner main panel and an outer main panel, the main chamber formed by overlapping the inner main panel and the outer main panel and sewing outer edges thereof, the pre-chamber formed by sewing one pre-chamber panel to the inner main panel,
   wherein a baffle panel having an inner edge part connected to an inner surface of the inner main panel and an outer edge part connected to the inner surface of the outer main panel is provided, and the baffle panel separates the main chamber into a forward main chamber and a rear main chamber,
   wherein the integral joint is made of at least three overlapping layers including the inner main panel, the front edge part of the pre-chamber panel, and the inner edge part of the baffle panel, and
   wherein a reinforcement cloth is provided between the front edge part of the pre-chamber panel and an outer surface of the inner main panel, and the integral joint is made of four overlapping layers that include the reinforcement cloth.

2. The side airbag device according to claim 1, wherein a first inner vent is formed on the inner main panel so that expansion gas can flow from the pre-chamber to the main chamber via said first inner vent.

3. The side airbag device according to claim 1, wherein a second inner vent is formed on the baffle panel so that expansion gas can flow from the rear main chamber to the forward main chamber via said second inner vent.

4. The side airbag device according to claim 1, wherein the inner edge part of the baffle panel is arranged along the front edge part of the pre-chamber.

5. The side airbag device according to claim 1, wherein the front edge part of the pre-chamber is provided so as to draw a curve when viewed from the side part of the vehicle seat in a width direction.

6. The side airbag device according to claim 1, wherein the front edge part of the pre-chamber and the inner edge part of the baffle panel are provided so as to overlap and draw a curve when viewed from the side part of the vehicle seat in a width direction.

7. A method of manufacturing the airbag device according to claim 1, the method comprising:
   temporarily sewing a front edge part of the pre-chamber panel to the inner main panel; and
   after temporarily sewing the front edge part of the pre-chamber panel to the inner main pain, sewing the front edge part of the pre-chamber panel, the inner main panel, and the inner edge part of the baffle panel at a same time.

8. A side airbag device stowed in a seatback of a vehicle seat, the side airbag device comprising:
   an inflator arranged on an occupant side of a side frame positioned on a side part of the seatback, the inflator operative to generate expansion gas; and
   an airbag for expanding due to the expansion gas and protecting an occupant seated in the vehicle seat, the airbag including a main chamber for deployment forward of the seatback, and a pre-chamber stowing the inflator in an inner portion thereof and connected to the occupant side of the main chamber, and
   an integral joint with no gaps present formed between at least a front edge part of the pre-chamber and the main chamber,
   wherein the airbag includes a baffle panel having an inner edge part connected to the inner surface of the inner main panel and an outer edge part connected to an inner surface of the outer main panel,
   wherein a front edge part of the pre-chamber is provided so as to draw a curve when viewed from a side part of the vehicle seat in a width direction, and
   wherein the front edge part of the pre-chamber and the inner edge part of the baffle panel overlap and draw a curve when viewed from the side part of the vehicle seat in a width direction.

9. The side airbag device of claim 8, further comprising a reinforcing cloth between a front edge part of the pre-chamber panel and an outer surface of the inner main panel, the integral joint made of four layers including the inner panel, the front edge part of the pre-chamber panel, the inner edge part of the baffle panel and the reinforcing cloth.

10. An airbag for storing in a seatback of a vehicle seat, the airbag comprising:
   a main chamber for deployment forward of the seatback, the main chamber including an inner main panel and an outer main panel, the main chamber formed by overlapping the inner main panel and the outer main panel and sewing outer edges thereof;
   a pre-chamber for stowing an inflator in an inner portion thereof and for connection to an occupant side of the main chamber, the pre-chamber formed by sewing one pre-chamber panel to the inner main panel;

a baffle panel having an inner edge part connected to an inner surface of the inner main panel and an outer edge part connected to the inner surface of the outer main panel, the baffle panel separating the main chamber into a forward main chamber and a rear main chamber; and a reinforcement cloth between the front edge part of the pre-chamber panel and an outer surface of the inner main panel, wherein the airbag is expandable by expansion gas from the inflator and configured for protecting an occupant seated in the vehicle seat.

11. The airbag of claim 10 in combination with a side airbag device, the side airbag device further comprising an inflator for arrangement on an occupant side of a side frame positioned on a side part of the seatback, the inflator operative to generate expansion gas.

12. The airbag of claim 10, further comprising an integral joint with no gaps present formed between at least a front edge part of the pre-chamber and the main chamber.

13. The airbag of claim 12, wherein the integral joint is made of at least three overlapping layers including the inner main panel, the front edge part of the pre-chamber panel, and the inner edge part of the baffle panel.

14. The airbag of claim 13, wherein the integral joint is made of four overlapping layers that include the reinforcement cloth.

* * * * *